W. E. LAND.
AXLE SKEIN.
APPLICATION FILED SEPT. 11, 1915.
1,197,040. Patented Sept. 5, 1916.
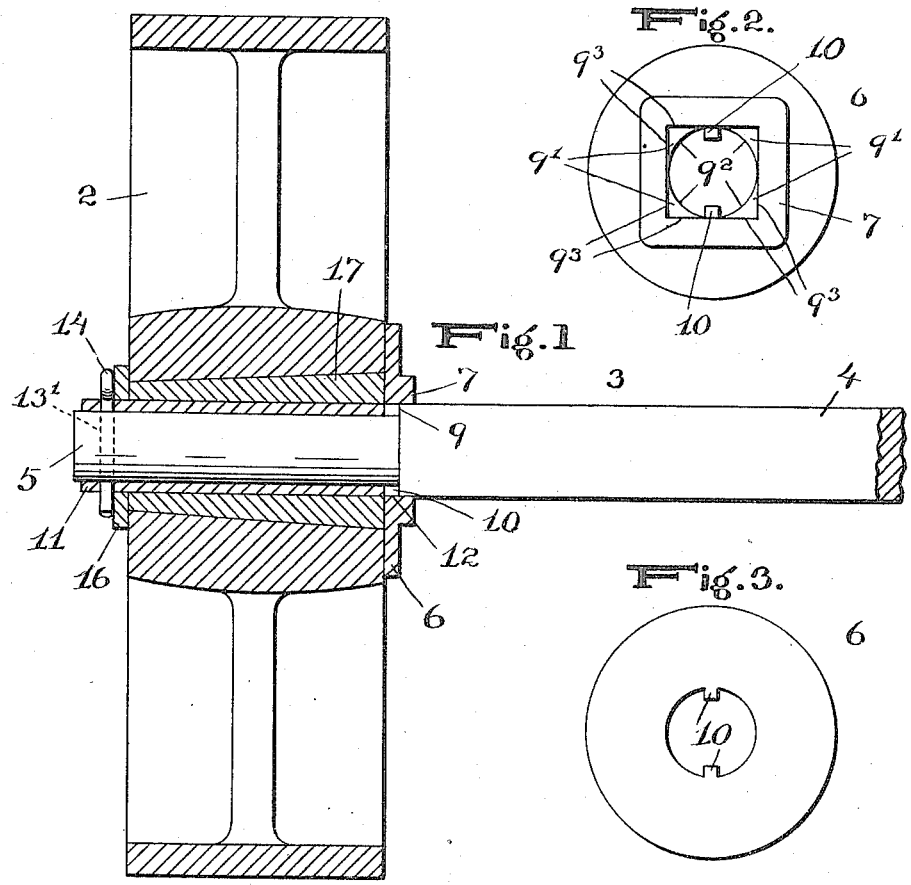
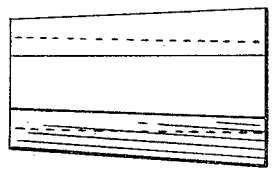
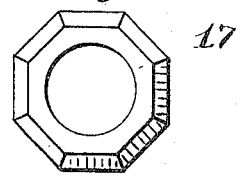
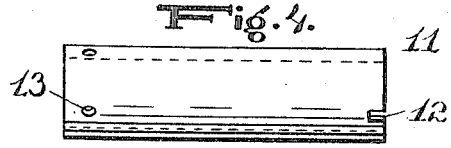
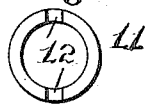
Witness
Stuart Hilder.
Inventor
W. E. Land,
By E. W. Anderson
his Attorneys

UNITED STATES PATENT OFFICE.

WILLIE E. LAND, OF NORFOLK, VIRGINIA.

AXLE-SKEIN.

1,197,040.     Specification of Letters Patent.     Patented Sept. 5, 1916.

Application filed September 11, 1915. Serial No. 50,229.

*To all whom it may concern:*

Be it known that I, WILLIE E. LAND, a citizen of the United States, resident of Norfolk, in the county of Norfolk and State of Virginia, have made a certain new and useful Invention in Axle-Skeins; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a central longitudinal section of the invention, as applied. Fig. 2 is a face view of the washer, taken from the rear. Fig. 3 is a similar view taken from the front. Fig. 4 is a side view of the skein. Fig. 5 is an end view of the same. Fig. 6 is a side view of the bushing. Fig. 7 is an end view of the same.

The invention has relation to axle skeins, having for its object mainly to provide an improved axle skein for hand truck vehicle and other wheels capable of being readily removed and replaced by a new skein when required.

The invention consists in the novel construction and combinations of parts, as hereinafter set forth.

In the accompanying drawings, illustrating the invention, the numeral 2 designates the wheel of a truck, and 3 the axle thereof, having the usual squared body 4 and the spindle 5, a washer 6 fitting over said spindle and being provided with an inner extension 7, having a squared seat for the squared outer end or corner of said body, to secure the washer against turning with the wheel, the hub of which bears thereagainst at its inner side, said washer having a stop shoulder 9 fitting against the outer end of said body.

The stop shoulder consists usually of four triangular sections 9', bounded on the inner side by a quadrant $9^2$, the circle made up of the quadrants forming the aperture of the washer, and the other sides $9^3$ of said sections being tangent to said circle. The washer is also provided with a radial projection or projections 10, 10, located at opposite junctions of said sections. The tubular skein 11 fits over the axle spindle and is provided at its inner end with opposite notches 12, 12, engaging said radial projections of the washer, to hold the skein against turning, said skein having at its outer end perforation 13, with which, and a perforation 13' of the spindle, the key 14 has engagement. An outer washer 16 is located between said key and the outer end of the wheel hub.

When the skein becomes worn, it may be readily removed and replaced by a new skein. Each skein is a true hollow cylinder, without projections from its cylindrical surfaces. The skein and the washer are the only new parts needed in the application of this invention, which is simple and efficient.

It is preferred to provide the wheel hub with a bushing 17, of polygonal tapering form, fitting in a tapering polygonal seat of the hub.

I claim:

1. The combination with an axle having a prismatic body and a spindle, of a washer having a polygonal seat corresponding to and closely engaging the sides of said body, a stop shoulder engaging the outer end of said body and radial projections, and a skein of true cylindrical form having at its inner end opposite notches engaging said projections.

2. The combination with an axle having a prismatic body and a spindle, of a washer having an extension provided with a polygonal seat corresponding to and closely engaging the sides of said prismatic body, the sides of said seat being tangent to the aperture of the washer, said washer having a stop shoulder composed of sections bounded upon the inside by the edges of the washer aperture and upon the outside by the sides of said seat and engaging the outer end of said body, and radial projections located between the sections of said shoulder, and a skein of true cylindrical form having at its inner end opposite notches engaging said projections.

In testimony whereof I affix my signature in presence of two witnesses.

WILLIE E. LAND.

Witnesses:
B. M. EDWARDS,
C. M. BORN.

Copies of this patent may be obtained for five cents each, by addressing the "Commissioner of Patents, Washington, D. C."